United States Patent [19]

Rajakovics

[11] 4,002,536
[45] Jan. 11, 1977

[54] ARRANGEMENT FOR PREVENTING UNDESIRED FLUID BACKFLOW DURING START-UP AND SHUTDOWN OF TWO-STAGE EVAPORATION INSTALLATIONS

[75] Inventor: Gundolf E. Rajakovics, Vienna, Austria

[73] Assignee: Vereinigte Edelstahlwerke Aktiengesellschaft, Vienna, Austria

[22] Filed: Jan. 23, 1975

[21] Appl. No.: 543,421

[30] Foreign Application Priority Data

Jan. 25, 1974  Austria .................................. 639/74

[52] U.S. Cl. .......................... 202/173; 159/DIG. 12;
202/185 R; 202/180; 202/179; 202/181;
137/428; 203/84; 176/37; 176/14
[51] Int. Cl.² .......................................... B01D 1/30
[58] Field of Search ........... 202/173, 185 R, 185 A,
202/172, 174, 180, 181, 179; 203/73, 84;
137/397, 398, 409, 386, 428, 430, 432, 572;
159/DIG. 12

[56] References Cited

UNITED STATES PATENTS

| 2,568,506 | 9/1951 | Mercer | 137/398 X |
| 3,461,460 | 8/1969 | McGrath | 203/73 X |
| 3,481,835 | 12/1969 | Carnavos | 202/174 |
| 3,875,988 | 4/1975 | Machida et al. | 202/174 X |

*Primary Examiner*—James H. Tayman, Jr.

[57] ABSTRACT

A float valve arrangement is disposed in a mixing condenser that is arranged intermediate the first and second stage of a two-stage evaporation installation suitable for purifying radio-active liquids. In normal operation, vapor evaporated in the first stage extends via a first conduit into the mixing condenser where such vapor is condensed by contact with a portion of the liquid in the second stage that is circulated back to the mixing condenser via a pump. The normal vapor pressure generated in the first stage keeps the float valve open and permits the steam to displace, into the second stage, liquid present in the mixing condenser. During start-up and shutdown of the installation wherein vapor from the first stage is no longer present, the resulting rise in liquid level in the mixing condenser causes the float valve to close and to prevent any backflow of liquid into the first stage via the first conduit.

6 Claims, 1 Drawing Figure

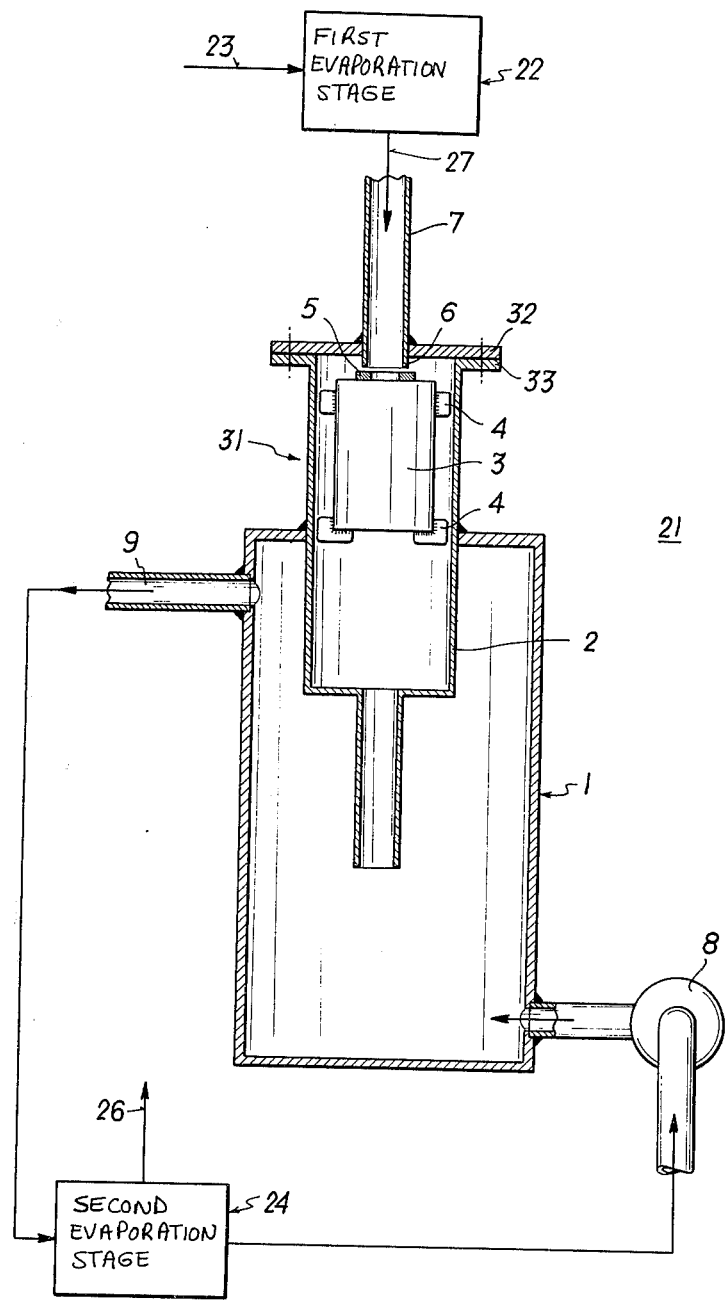

ARRANGEMENT FOR PREVENTING UNDESIRED FLUID BACKFLOW DURING START-UP AND SHUTDOWN OF TWO-STAGE EVAPORATION INSTALLATIONS

BACKGROUND OF THE INVENTION

In two-stage evaporation installations for the purification of radio-active liquid wastes, vapor arising from the evaporation of the liquid in the first stage flows into a mixing condenser disposed intermediate the first and second stages. In such mixing condenser, the vapor in the first conduit is condensed by contact with liquid introduced into the mixing condenser via a feed back path from the second stage. Such feed back path includes a circulating pump that maintains a back pressure in the mixing condenser that corresponds to the normal pressure difference between the first and second stages arising from the higher vapor temperature in the first stage.

During a normal work cycle of such installation wherein the pump is in operation, vapor flow is propelled from the higher-pressure first stage into the mixing condenser via the first conduit. However, during start-up of the installation when the pump is first placed into operation with the mixing condenser filled to its normal working level, the absence of vapor pressure in the first evaporation stage would normally tend to cause a backflow of liquid from the mixing condenser into such first stage, since the first conduit represents a path of least resistance for such backflow.

Several arrangments have been proposed in the past for preventing such backflow. In one arrangement, a regulation device responding to the pressure in the first stage controls continuously the pressure produced by the circulation pump of the second stage to an equal value of the first stage. Another proposal suggests that the first conduit should be arranged vertically to such a height that the pressure produced by the circulation pump of the second stage could be balanced by a water column in this vertical conduit in case of absence of the pressure of the first stage. A third arrangement employs a blocking member interposed in the first conduit and adapted to be opened only when the required pressure differential conditions are established in the installation.

All of such arrangements are technically complex and/or expensive.

SUMMARY OF THE INVENTION

The present invention provides an improved arrangement for preventing backflow from the mixing condenser to the first stage in two-stage evaporation installations of this type. In an illustrative embodiment a float valve is arranged in the first conduit in the path of the vapor flowing from the first stage to the mixing zone of the mixing condenser, said float valve opening only at normal operation pressure of the first stage.

The float blocking member preferably will be so located that it closes even at shutdown of the circulation pump of the second stage caused by the water level in the second stage or the mixing condenser, respectively, as long as no excess pressure is existing in the first stage. This is increasing the stability of the blocking member and conserving the seal of the blocking member at putting into operation the circulation pump of the second stage. After the circulation pump has been taken into operation the blocking member is not only sealing due to the lift of the float but in addition because of the excess pressure produced by the pump. In the course of a pressure increase in the first stage the pressure difference effective upon the float is decreasing and finally completely disappearing at equal pressure. By an additional small pressure increase the float lift is overcome, the blocking member is somewhat opening and the vapor of the first stage passing through, by means of the small excess pressure, displaces very quickly the water carrying the float whereby the blocking member is completely opening immediately. The closing process at shutdown of the installation occurs in an analogous way. This solution combines the advantages of being fully automatical with having best availability, high stability and long working life. It can be manufactured at low cost.

BRIEF DESCRIPTION OF THE DRAWING

The invention is further set forth in the following detailed description taken in conjunction with the appended drawing in which the single figure illustrates schematically an arrangement for preventing backflow from the mixing condenser to the first stage in a two-stage evaporation installation.

DETAILED DESCRIPTION

Referring now to the drawing, the numeral 21 represents an overall two-stage evaporation installation in which radioactive liquid to be purified is conducted into a first stage 22 of the installation via an inlet pipe 23. Vapor generated in the first stage 22 is coupled into mixing condenser 1 via conduit 7 in the manner to be described. Such mixing condenser 1 communicates via a pipe 9 with a second stage 24 of the installation 21. The stage 24 has an outlet steam pipe 26 which is suitably coupled to a conventional utilization apparatus (not shown). A portion of the liquid in the second evaporation stage 24 is recirculated into mixing condenser 1 via pump 8. Such pump maintains equilibrium pressure conditions in installation 21, the working excess pressure of the first stage 22 over that of the second stage 24 resulting from the higher vapor temperature in the first stage.

A two-stage evaporation installation of the general type indicated above is further described in the now-allowed copending, coassigned application Ser. No. 328,065 entitled "Process and Arrangement For Vaporizing of Liquids".

During normal operation of the installation the excess pressure in the stage 22 maintains a vapor flow between such stage and the interior of the mixing condenser 1 in the direction of an arrow 27. If the pressure in the first and second stage is equalized, starting of pump 8 will tend to cause liquid to flow in the reversed direction from the mixing condenser 1 to the first stage 22 via conduit 7 since such conduit represents in general the lowest path of resistance for such fluid flow; the other outlet of the mixing condenser, tube 9, is usually associated with an expansion-type valve (not shown) that has a comparatively high resistance to fluid flow.

In accordance with the invention, an improved arrangement for preventing such undesired backflow from the mixing condenser 1 to the first stage 22 is provided in a relatively inexpensive and technically feasible manner by incorporating a float valve assembly 31 within the conduit 7, illustratively at the interface between conduit 7 and mixing condenser 1.

The valve assembly 31 effectively divides the conduit 7 into an upper portion, which extends upstream to the first stage 22, and a lower portion which extends to and communicates with the mixing condenser 1.

Structurally, the float valve assembly 31 includes a hollow housing 2 that extends downwardly into the interior of mixing condenser 1 to define the lower portion of the conduit 7. The upper portion of conduit 7 is welded to a cover plate 32 that is attached to a top flange 33 of housing 2 and end 6 projects somewhat into the upper portion of housing 2.

A float body 3 is vertically guided within housing 2 by means of a plurality of radial plates 4. The surface of body 3 includes a sealing surface 5 which cooperates with the projecting end 6 of conduit 7 to cause closure of valve assembly 31 whenever the liquid level in housing 2 rises to the required value. Similarly, the sealing surface 5 withdraws downwardly from end 6 of the conduit 7 to open valve assembly 31 whenver the liquid level in housing 2 drops below said value.

The manner in which the desired backflow prevention is accomplished with the use of arrangement 31 is as follows:

Before start-up of the installation, the mixing condenser 1 is filled with liquid, and thereby the communicating lower portion of the housing 2 is filled to a corresponding first level, whereby the float body 3 in the valve arrangement 31 rises sufficiently so that sealing member 5 contacts tube end 6 to close off valve assembly 31. Consequently, first stage 22 is isolated from mixing condenser 1 so that when pump 8 is now started no backflow of liquid from the mixing condenser 1 to stage 22 can take place. Even if the float valve is not closed prior to starting pump 8 when the housing 2 is filled to its first level, it will be immediately be so after starting because of the rise in liquid level in the condenser 1 and thereby in the housing 2, such liquid rise being caused by the liquid forced from mixing condenser 1 into the housing 5 by the pressure of pump 8. The pressure, produced by pump 8, in mixing condenser 1 and, thus, in housing 2 actually will always force float body 3 more tightly against tube end 6 to improve the seal therebetween.

Increasing pressure in the first evaporating stage and, thereby, in vapor conduit 7 effects a drop of the closing force until, at equal pressures within the first evaporating stage and mixing condenser 1, said force corresponds merely to the lift of float 3. By a further small pressure increase within the first evaporating stage this lifting force, too, is overcome and sealing surface 5 is somewhat lifting itself from tube end 6 permitting the vapor of the first stage to flow into housing 2 displacing from there the water which is conducted by means of conduit 9 to the second stage. This causes float 3 to lose its lift and to sink within housing 2 thus opening the complete opening cross section at tube end 6. The vapor of the first evaporating stage 22 is permitted to flow to the mixing zone of mixing condenser 1 so that normal operation can take place.

If the pressure in the first stage is again dropping during shutoff, the liquid of mixing condenser 1 is flowing and rising in housing 2 thereby lifting float 3 until, finally, it presses by sealing surface 5 against tube end 6 by its lift. As a consequence, first and second evaporating stages are tightly separated from each other again. After the pressure in the first stage has sufficiently dropped, operation of circulating pump 8 may be shut off too.

In the foregoing, the invention has been described in connection with an illustrative arrangement thereof. Many variations and modifications will now occur to those skilled in the art. It is accordingly desired that the scope of the appended claims not be limited to the specific disclosure herein contained.

What is claimed is:

1. In a two-stage evaporation installation for the purification of liquids, wherein a mixing condenser is disposed intermediate first and second evaporation stages, the first stage being normally maintained at a pressure above that of the second stage, and a pump for normally forcing a portion of the liquid from the second stage to the mixing condenser; and wherein vapor generated in the first stage is conducted via a first conduit to the mixing condenser where such vapor is condensed by contact with the portion of the liquid of the second stage that is forced into the mixing condenser by the pump, the first conduit being disposed so that the liquid is maintained at a first level in the first conduit when both the first stage and the pump are inoperative, the liquid in the first conduit being displaced by the vapor coming from the first stage when said first stage is operative, an improved arrangement for preventing backflow of liquid through the first conduit to the first stage when said pump is operative and said first stage is inoperative, which comprises float valve means disposed in said conduit and separating said first conduit into a first section originating in the first stage and into a second section leading to the mixing condenser, said float valve means being open when the first conduit exhibits the first liquid level, said float valve means closing upon a rise in the liquid level from the first level resulting from the forcing of liquid into the second section of the first conduit by the pump when the pump is made operative and while the first stage remains inoperative.

2. An installation as defined in claim 1, in which the float valve means comprises, in combination, a hollow housing, a float body quided for vertical movement inside the housing and having a seal on its upper part in order to cooperate with the end of the first section of said first conduit ending at the top of said hollow housing, said seal of the float body being forced against said end of said first section of said first conduit by liquid rising inside said hollow housing, the float body being in flow contact with the vapor when the first stage is operative, and means effecting communication between the hollow housing and the mixing condenser and forming, together with said hollow housing, the second section of the first conduit.

3. An installation as defined in claim 2, wherein the hollow housing extends at least partly into the mixing condenser so that at least a part of said second section of said first conduit is inside said mixing condenser.

4. In a two-stage evaporation installation for the purification of liquids, wherein a mixing condenser is disposed intermediate first and second evaporation stages, the first stage being normally maintained at a pressure above that of the second stage, and a pump for normally forcing a portion of the liquid from the second stage to the mixing condenser; and wherein vapor generated in the first stage is conducted via a first conduit to the mixing condenser where such vapor is condensed by contact with the portion of the liquid of the second stage that is forced into the mixing condenser by the pump, the liquid in the first conduit being displaced by the vapor coming from the first stage when said first stage is operative, an improved arrangement for preventing backflow of liquid through the first conduit to the first stage when said pump is operative and said first stage is inoperative, which comprises float valve means disposed in said first conduit and separating said first conduit into a first section originating in the first stage and into a second section leading to the mixing condenser, said float valve means being closed by the liquid in said second section of said first conduit when both the first stage and said pump are inoperative.

5. An installation as defined in claim 4, in which the float valve means comprises, in combination, a hollow housing, a float body guided for vertical movement inside the housing and having a seal on its upper part in order to cooperate with the end of the first section of said first conduit ending at the top of said hollow housing, said seal of the float body being forced against said end of said first section of said first conduit by liquid rising inside said hollow housing, the float body being in flow contact with the vapor when the first stage is operative, and means effecting communication between the hollow housing and the mixing condenser and forming, together with said hollow housing, the second section of the first conduit.

6. An installation as defined in claim 5, wherein the hollow extends at least partly into the mixing condenser so that at least a part of said second section of said first conduit is inside said mixing condenser.

\* \* \* \* \*

UNITED STATES PATENT OFFICE
CERTIFICATE OF CORRECTION

Patent No. 4,002,536            Dated January 11, 1977

Inventor(s) Gundolf Rajakovics

It is certified that error appears in the above-identified patent and that said Letters Patent are hereby corrected as shown below:

On the cover sheet (Item) 73, Assignee should read:

-- Vereinigte Edelstahlwerke Aktiengesellschaft (VEW) --.

Signed and Sealed this

Twentieth Day of September 1977

[SEAL]

Attest:

RUTH C. MASON
*Attesting Officer*

LUTRELLE F. PARKER
*Acting Commissioner of Patents and Trademarks*